F. R. CORNWALL.
BRAKE HANGER MOUNTING.
APPLICATION FILED NOV. 29, 1910.
989,339.
Patented Apr. 11, 1911.
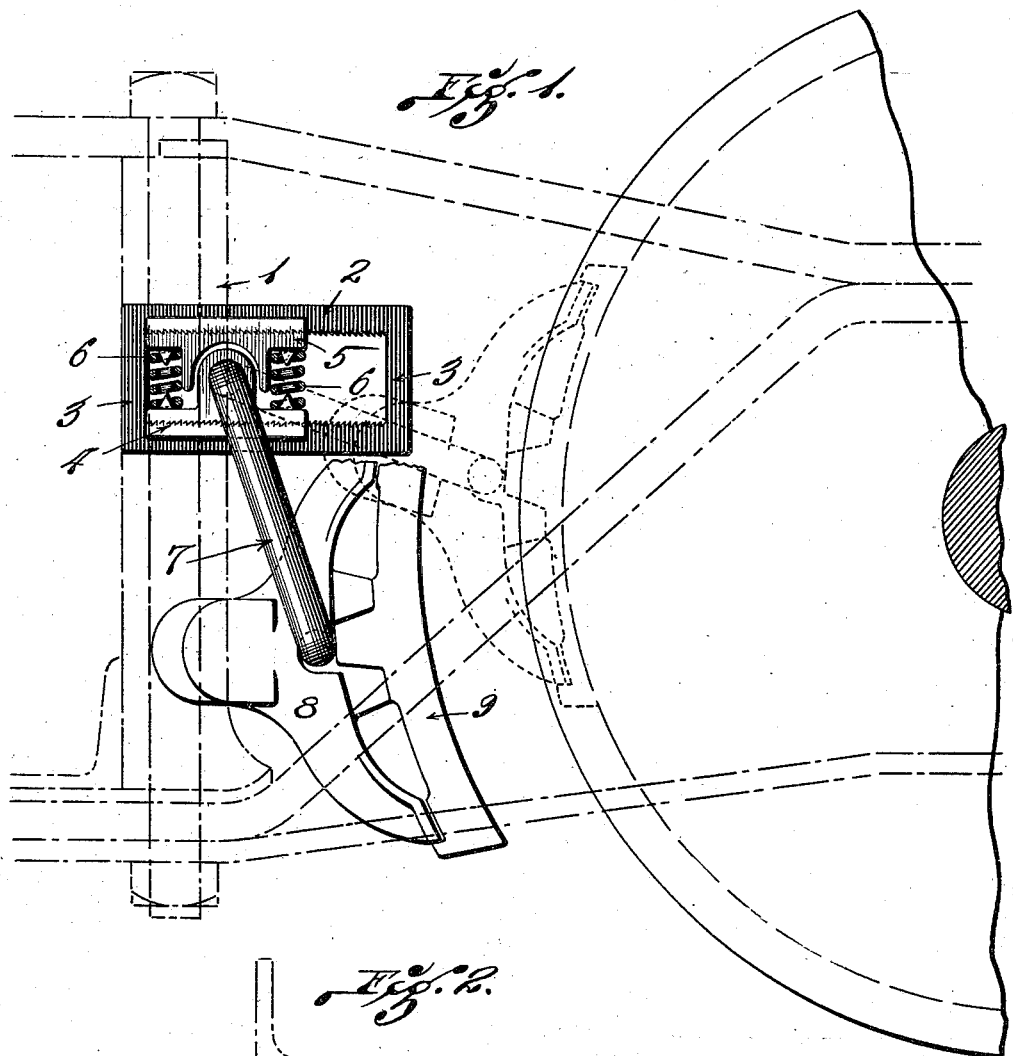
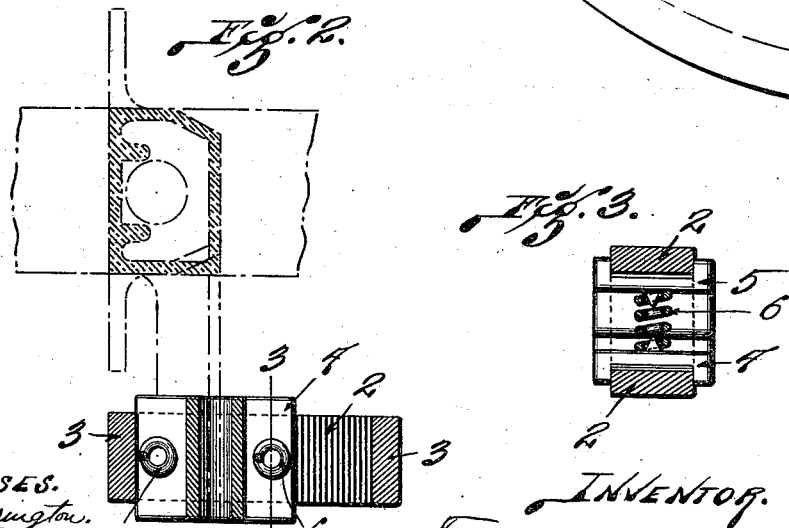

UNITED STATES PATENT OFFICE.

FREDERICK R. CORNWALL, OF ST. LOUIS, MISSOURI, ASSIGNOR TO CHICAGO RAILWAY EQUIPMENT COMPANY, OF CHICAGO, ILLINOIS, A CORPORATION OF ILLINOIS.

BRAKE-HANGER MOUNTING.

989,339.  Specification of Letters Patent.  Patented Apr. 11, 1911.

Application filed November 29, 1910. Serial No. 594,694.

*To all whom it may concern:*

Be it known that I, FREDERICK R. CORNWALL, a citizen of the United States, residing at St. Louis, Missouri, have invented a certain new and useful Improvement in Brake-Hanger Mountings, of which the following is a full, clear, and exact description, such as will enable others skilled in the art to which it appertains to make and use the same, reference being had to the accompanying drawings, forming part of this specification, in which—

Figure 1 is a side elevational view of my improved hanger mounting; Fig. 2 is a horizontal sectional view through the same. Fig. 3 is a sectional view on the line 3—3 of Fig. 2.

This invention relates to a new and useful improvement in a brake hanger mounting designed particularly for use in car trucks, the object being to construct a mounting of the character described, in the nature of a bracket to be attached in position so as to automatically provide a new pivotal support to the brake hanger when the wearing of the shoe or the reduction in the diameter of the wheel with which the brake shoe coöperates renders a change in the pivotal support of the hanger necessary or desirable.

In recent years, steel car wheels have gone into extensive use, with the result that repeated grinding of these wheels for the purpose of truing them when worn and extending their life has necessitated some changes in the brake rigging to meet these new conditions. For instance, a wheel 33 inches in diameter may be reduced eventually to 30 inches in diameter, and such reduction will change the relation of the brake beam to the wheels, particularly if the old pivotal supports for the brake beams remain unchanged. The tendency is, when the wheel is reduced and the brake shoe worn, to bind or cramp the brake in a set position, as, for instance, when a wheel is moved in the direction of the arrow, as shown by the dotted lines in Fig. 1. This results in an abnormal upward movement of the brake shoe on the wheel, which causes the brake head to coöperate with the brake hanger, as a toggle link, which renders it hard and difficult to release the brakes.

According to my improvement, when the wheel is of the usual diameter and the brake shoe new, the brake hanger is arranged in its support on the column guide or other part of the truck in the usual manner. When the brake shoe is worn or the wheel is reduced so that the brake shoe rides up the wheel an abnormal extent, which movement would tend to produce the cramping action mentioned, I provide a bracket which may be secured in position on the column guide or other part of the truck, or which may be made an integral part of the truck, said bracket consisting of two horizontally disposed track members preferably connected at their ends having ratchet teeth which coöperate with a two-part expansible block forming the brake hanger, whereby when the brake is applied and the brake beam swings to an abnormally high position, the hanger draws the bearing block inwardly toward the wheel thereby automatically changing the location of the support for the hanger. This automatic adjustment of the hanger block or bearing follows the wearing of the shoe or the reduction in diameter of the wheel, and the brake beam is thus caused to occupy its normal relation to the wheel at all times. In the event that a new wheel is placed in position or a new brake shoe employed, which would tend to destroy the proper relation between the brake beam and wheel after the same has moved inwardly, the members of the hanger block are compressed and the hanger block retracted to the desired position. The ratchet teeth prevent retrograde movement of the hanger block to permit the automatic forward feed of said block to change the location of the hanger whenever the angle assumed by the hanger in the application of the brakes is sufficient to overcome the frictional resistance incident to the expansible hanger block.

In the drawings, 1 indicates the column guide of the truck which is provided with a suitable frame consisting of the horizontal bars 2 having ratchet teeth on their inner edges, the ends of said bars being preferably connected by vertical members 3.

4 is a section of the hanger block also having ratchet teeth in a channel in which fits the lower ratcheted bar 2.

5 is the upper section of the hanger block which is preferably separable from the block 4 and which embraces the bearing lug of said block 4 whereby both parts of the bearing block may move together along the horizontal ratcheted bars 2, and, at the same time, the parts of said block may be extended to engage said bars by means of the springs, 6.

7 is a brake hanger.

8 is the brake head on the end of the beam, and 9 is the brake shoe.

I am aware that minor changes may be made in the construction and arrangement of the several parts of my device without in the least departing from the nature and principle of my invention.

I claim:

1. The combination of a car truck having means for the suspension of the brake hanger therefrom, and means for automatically changing the point of suspension of said brake hanger with relation to said truck.

2. The combination of a car truck having means for the suspension of the brake hanger therefrom, a wheel, and means for automatically adjusting the point of suspension of said brake hanger toward said wheel.

3. The combination with a car truck of a brake hanger support mounted thereon, a brake hanger suspended from said support, and means for automatically changing the position of said support whenever the brake hanger reaches an abnormal angle of inclination.

4. The combination with a car truck, of a movable brake hanger support mounted thereon, a brake hanger suspended from said support, and automatic means for permitting the movement of said support and holding said support in different positions whenever the angle of inclination of the brake hanger becomes abnormal.

5. The combination with a car truck, of a two-part automatically adjustable brake hanger support mounted thereon, and a brake hanger suspended from said support.

6. The combination with a car truck, of an expansible brake hanger support mounted thereon, yielding means for expanding the parts of said support and a brake hanger suspended therefrom.

7. The combination of a brake hanger support, a plurality of toothed bars arranged thereon, and an expansible brake hanger support coöperating with said toothed bars.

8. The combination with a car truck, of a plurality of bars arranged thereon and an expansible two-part brake hanger support arranged between said bars.

9. The combination with a car truck, of a brake hanger support mounted thereon, said support comprising two pieces and springs for forcing said pieces apart.

10. The combination with a car truck, of a two-part brake hanger support mounted thereon, the parts of said brake hanger support permitting vertical expansion but insuring coincident horizontal movement.

11. A brake hanger support comprising a lug for receiving the brake hanger, and a channel portion for coöperating with a truck guide and moving thereon.

12. A brake hanger support comprising a lug for receiving the brake hanger, and a notched channel portion for coöperating with a truck guide.

13. A brake hanger support comprising two members engaging each other so as to permit vertical movement and insure coincident horizontal movement, both of said portions being provided with guiding faces coöperating with the horizontally disposed truck guides.

In testimony whereof I hereunto affix my signature in the presence of two witnesses, this 25th day of November, 1910.

FREDERICK R. CORNWALL.

Witnesses:
M. P. SMITH,
BLANCHE L. CROWLEY.

---

Copies of this patent may be obtained for five cents each, by addressing the "Commissioner of Patents, Washington, D. C."